United States Patent
Fujiwara et al.

(10) Patent No.: US 8,142,935 B2
(45) Date of Patent: Mar. 27, 2012

(54) APPARATUS FOR PRODUCING A BATTERY PLATE EXPANDED GRID

(75) Inventors: Yoshiomi Fujiwara, Kyoto (JP); Hiroyuki Tanaka, Kyoto (JP); Tadashi Nishida, Kyoto (JP)

(73) Assignee: GS Yuasa International Ltd., Kyoto (JP)

( * ) Notice: Subject to any disclaimer, the term of this patent is extended or adjusted under 35 U.S.C. 154(b) by 0 days.

(21) Appl. No.: 12/229,812

(22) Filed: Aug. 27, 2008

(65) Prior Publication Data

US 2009/0000089 A1    Jan. 1, 2009

Related U.S. Application Data

(63) Continuation of application No. 10/305,546, filed on Nov. 27, 2002, now abandoned.

(30) Foreign Application Priority Data

Dec. 3, 2001 (JP) .................................. 2001-368453
Mar. 11, 2002 (JP) .................................. 2002-065640

(51) Int. Cl.
*H01M 4/74* (2006.01)
*B21D 31/04* (2006.01)

(52) U.S. Cl. ........... 429/242; 429/243; 29/6.1; 29/623.1

(58) Field of Classification Search .................. 429/241, 429/242; 29/6.1
See application file for complete search history.

(56) References Cited

U.S. PATENT DOCUMENTS

| | | | |
|---|---|---|---|
| 4,291,443 A | | 9/1981 | Laurie et al. |
| 4,475,990 A | * | 10/1984 | Katsuhiro et al. ............... 205/63 |
| 5,136,765 A | | 8/1992 | Tanaka et al. |
| 5,216,962 A | * | 6/1993 | Parigi et al. ...................... 83/344 |
| 6,212,744 B1 | * | 4/2001 | Inanobe et al. ................... 29/6.1 |

FOREIGN PATENT DOCUMENTS

| | | | |
|---|---|---|---|
| CA | 1106703 | | 8/1981 |
| JP | 54-28424 | | 9/1979 |
| JP | 10-223232 | | 8/1998 |
| JP | 2000-106190 | | 4/2000 |
| JP | 2000-153322 | | 6/2000 |
| JP | 2000153322 A | * | 6/2000 |
| JP | 2002-260676 | | 9/2002 |
| JP | 2002260676 A | * | 9/2002 |

* cited by examiner

*Primary Examiner* — Keith Walker
(74) *Attorney, Agent, or Firm* — Jordan and Hamburg LLP

(57) ABSTRACT

A method where two disk cutter rolls are used to form slits in a staggered pattern in a metal sheet; disk cutters are part of the disk cutter rolls; ridges are arranged in a peripheral edge of the disk cutters; and valleys are arranged between the ridges, where an axis-to-axis distance L (mm) of the rolls satisfies a relationship of $2r-0.3 \leq L < 2r$ when a radius of a reference circumferential face made with the valleys is r (mm). The method can include a carrying procedure for passing the sheet between the rolls, then carrying the sheet along a peripheral face of one of the rolls, and then pulling out the sheet from the peripheral face.

3 Claims, 6 Drawing Sheets

Prior Art

Prior Art ated grid is corroded in a larger amount and the
APPARATUS FOR PRODUCING A BATTERY PLATE EXPANDED GRID This application is a divisional application of U.S. patent application Ser. No. 10/305,546 filed Nov. 27, 2002, which claims priority to Japan Patent Application No. 2001-368453 filed Dec. 3, 2001, and Japan Patent Application No. 2002-065640 filed Mar. 11, 2002. The contents of U.S. patent application Ser. No. 10/305,546 are hereby incorporated by reference into the present application in their entirety.

BACKGROUND OF THE INVENTION

The present invention relates to an apparatus for producing a grid for a battery plate by using a rotary expander, and a method of producing such a grid.

A battery plate of a lead storage battery is configured by filling an active material into meshes of a grid made of lead or a lead alloy. Such a grid is often produced by directly forming a grid-like shape by means of, for example, casting of lead or a lead alloy, or alternatively by forming meshes in a lead sheet made of lead or a lead alloy by an expander. Expanders for this purpose include an expander of the reciprocal type in which meshes are sequentially formed in a lead sheet with starting from both the ends of the sheet, by vertical motions of a die cutter, and that of the rotary type in which slits are formed in a lead sheet in a zigzag pattern by rotation of disk cutters (a slit forming step), and the lead sheet is stretched from both the sides to expand the slits into meshes (an expanding step).

FIG. 3 shows a configuration example of a conventional production apparatus in a slit forming step in an expander of the rotary type (rotary expander). In the rotary expander, on the right side of one disk cutter roll 1 in the figure, another disk cutter roll 2 is placed, and a further disk cutter roll 3 is placed below the disk cutter roll 2 in the figure. A lead sheet 4 made of lead or a lead alloy is passed between the three disk cutter rolls 1 to 3. In each of the disk cutter rolls 1 to 3, a large number of disk cutters 5 are arranged and fixed on a common rotation shaft with being separated from each other by a distance which is approximately equal to the thickness of one disk cutter 5.

Each of the disk cutters 5 is configured by a metal disk. As shown in FIG. 4, ridges 5a in which the peripheral side face protrudes in a ridge-like shape toward the outer periphery from a reference circumferential face of a predetermined radius centered at the axis of the disk, and valleys 5b in which the peripheral side face composed of a face substantially extending along the reference circumferential face is formed are alternately formed in a whole periphery in the circumferential direction. Although not so shown in FIG. 4, the disk cutters 5 of the disk cutter rolls 2 and 3 excluding the disk cutter roll 1 are configured in the following manner. In each of the valleys 5b, a groove 5c which is opened in the peripheral side face of the valley 5b is formed in a radial direction so that the grooves which are formed in every pair of valleys 5b adjacent to each other via the respective ridge 5a are arranged so as to be alternate on peripheral edges of both the disk faces. In FIGS. 4(b) and 4(c), the peripheral edge of one disk cutter 5 is shown in a partially enlarged manner while linearly developing the circumference.

The three disk cutter rolls 1 to 3 in each of which the thus configured disk cutters 5 are arranged are placed so that the axes of the rolls horizontally elongate in parallel to one another and the ridges 5a of the disk cutters 5 alternately engage each other. Specifically, in each of the disk cutters 5 of the left disk cutter roll 1, each ridge 5a which reaches the right end enters between the ridges 5a in the left end of the corresponding disk cutters of the right disk cutter roll 2, and, in each of the disk cutters 5 of the right disk cutter roll 2, each ridge 5a which reaches the lower end enters between the ridges 5a in the upper end of the corresponding disk cutters 5 of the lower disk cutter roll 3. The disk cutters 5 of the right and lower disk cutter roll 2 and 3 are placed so that the valleys 5b of the disk cutters slightly overlap with each other.

When the lead sheet 4 is passed between the left and right disk cutter rolls 1 and 2, the ridges 5a of the disk cutters 5 overlap with each other to cut the lead sheet 4, whereby a large number of slits 4a are formed as shown in a plan view in the circle $C_1$ of the one-dot chain line of FIG. 3. The portions between the slits 4a which are arranged in the width direction of the lead sheet 4 are pressed by the ridges 5a of the disk cutters 5 to alternately protrude to both sides in a ridge-like shape from the faces of the lead sheet 4, and formed as wires 4b. When the lead sheet 4 is passed between the upper and lower disk cutter rolls 2 and 3, the edges of the disk cutters 5 on the side where the grooves 5c of the valleys 5b are not formed vertically overlap with each other to cut the lead sheet 4, and the slits 4a which are arranged in the advancing direction of the lead sheet 4 are connected to each other as shown in a plan view in the circle $C_2$ of the one-dot chain line of FIG. 3. The portions where the slits 4a which are arranged in the advancing direction of the lead sheet 4 are not connected to each other are formed as nodes 4c. Therefore, the slits 4a formed in the lead sheet 4 are interrupted at intervals of a predetermined length along the advancing direction, and the nodes 4c are formed between the slits, respectively. In the slits 4a which are adjacent to each other in the width direction, the portions which are to be formed as the nodes 4c are formed with being shifted by a half pitch of the slits 4a. Therefore, the large number of slits 4a formed in the lead sheet 4 are arranged in a zigzag pattern as shown in the plan view in the circle $C_2$ of the one-dot chain line of FIG. 3.

The lead sheet 4 in which the large number of slits 4a have been formed in the slit forming step is stretched toward both the sides in the width direction in the subsequent step of the rotary expander. As a result, the slits 4a are expanded so as to form meshes, whereby a lattice-like grid which is to be used as a battery plate of a lead storage battery is produced.

In the conventional rotary expander, the lead sheet 4 are passed between the disk cutter rolls 1 and 2, and then between the disk cutter rolls 2 and 3, or processed two times. Therefore, the rotary expander has a problem in that, as compared with a grid which is processed by an expander of the reciprocal type, a whole grid is corroded in a larger amount and the life performance is lower. Since the lead sheet is passed two times between the three disk cutter rolls 1 to 3, shavings are produced in a large amount during the process. This causes many production disadvantages such as that a production line must be frequently cleaned. Specifically, many whisker-like lead shavings adhere to a grid which is produced by a conventional rotary expander. This is considered as one of causes of reduction of the formation efficiency in the case where a grid is used as a positive plate. Moreover, this increases the load of the disk cutters 5, so that the disk cutters are often required to be replaced with new ones because of wear at intervals of one year at the shortest.

The present inventor developed a technique in which, as shown in FIG. 5, the lead sheet 4 is processed by using only two disk cutter rolls 2 and 3 that are vertically arranged. In the technique, the lead sheet 4 which has been passed through between the upper and lower disk cutter rolls 2 and 3 is horizontally pulled out and then carried out, and hence the lead sheet 4 is in an unstable condition in a carrying-out portion. Consequently, there arise problems in that the sheet faces are undulated, and that meshes of an expanded grid often have irregular shapes.

In the disk cutters 5 of the upper and lower disk cutter rolls 2 and 3, the ridges 5a perform not only a function of cutting the lead sheet 4 to form the slits 4a, but also that of vertically protruding the wires 4b by ridge-like protrusions of the ridges 5a. When the ridges 5a are moved to the lower or upper end in accordance with the rotation of the disk cutters 5, therefore, the ridges 5a vertically penetrate the lead sheet 4 to bite between the slits 4a. When the ridges 5a are further moved in an upward or downward separating direction in accordance with the rotation of the disk cutters 5, the lead sheet 4 which is to be originally carried out in a horizontal direction is caught by the ridges 5a and tends to be moved upward or downward. For example, FIG. 6 shows the state in which the lead sheet 4 is caught by the ridges 5a of the lower disk cutters 5 and tends to be once moved downward in a carrying-out portion A in accordance with the rotation of the disk cutters 5. Moreover, the horizontal direction in which the lead sheet 4 is pulled out is in parallel to the axes of the two upper and lower disk cutter rolls 2 and 3, and elongates along the reference tangential plane which is perpendicular to the plane connecting the axes. During the carrying-out process, therefore, the lead sheet 4 is separated simultaneously from the ridges 5a of the upper and lower disk cutters 5. The direction along which the lead sheet 4 is actually moved together with the ridges 5a, or in either of the upward and downward directions is unstably changed at any time depending on the current manner of biting or catching the slits 4a by the ridges 5a. As a result, the lead sheet 4 is pulled out to the carrying-out portion A while being undulated. Furthermore, the lead sheet 4 is horizontally pulled out toward the right side of FIG. 6. Even when the ridges 5a are caught between the slits 4a, therefore, the ridges will be suddenly separated from the slits in accordance with the rotation of the disk cutters 5. As a result, each time when the ridges 5a are separated from the slits 4a, a vertical vibration occurs in the disk cutter rolls 2 and 3. This also sometimes causes the phenomena in which the lead sheet 4 is undulated, and in which meshes of an expanded grid often have irregular shapes.

SUMMARY OF THE INVENTION

The invention has been conducted in order to solve the above-discussed problems. It is an object of the invention to provide an apparatus for producing a grid for a battery plate in which slits are formed in a metal sheet while maintaining the axis-to-axis distance of two disk cutter rolls to an adequate value, and meshing edges of disk cutters by an appropriate overlapping dimension, whereby production of shaving and wear of the disk cutters are reduced, and in which the metal sheet is pulled out to be carried out after transported along one of the two disk cutter rolls, whereby a grid having meshes of a uniformly regular shape can be stably produced, and also a method of producing such a grid.

The invention provides an apparatus for producing a grid for a battery plate in which two disk cutter rolls are opposed to each other, and a metal sheet is passed between the disk cutter rolls to form a large number of slits in a zigzag pattern in the metal sheet, wherein each of the disk cutter rolls is configured by placing a plurality of disk cutters on a same shaft with forming a gap therebetween, each of the disk cutters is configured by: alternately forming, in a whole periphery of a peripheral edge of a disk, ridges in which a peripheral side face protrudes in a ridge-like shape toward an outer periphery from a reference circumferential face of a radius r (mm), and valleys in which a peripheral side face composed of a face extending along the reference circumferential face is formed, the reference circumferential face being centered at an axis of the disk; and, for each of the valleys, forming a groove which is opened in a peripheral side face of the valley, in a peripheral edge portion of one of disk faces in which valleys that are adjacent to each other via a ridge are formed in an oppositely reverse manner, and an axis-to-axis distance L (mm) of the disk cutter rolls satisfies a relationship of $2r-0.3 \leq L < 2r$.

According to the invention, a metal sheet is passed only one time between the two disk cutter rolls to form slits in the metal sheet. Therefore, metal shavings are produced in a less amount, so that, when a grid which is produced by expanding the metal sheet is used as a positive plate, the formation efficiency and the life performance of the plate can be improved. Moreover, the load of the disk cutters is reduced, and hence the replacement frequency of the disk cutter rolls can be lowered.

The invention is characterized in that the apparatus comprises transporting means for once transporting the metal sheet which has been passed through between the two disk cutter rolls, along a peripheral face of one of the disk cutter rolls, and carrying out the metal sheet with pulling out the metal sheet from a position of the peripheral face in a tangential direction.

According to the invention, after being passed through between the two disk cutter rolls, a metal sheet is once transported along the peripheral face of one of the disk cutter rolls. When the angle at which the metal sheet passed through between the two disk cutter rolls is pulled out to be carried out is set to be along the reference tangential plane, the metal sheet is separated simultaneously from the peripheral faces of the two disk cutter rolls, and hence unstably carried out. By contrast, in the invention, a metal sheet is pulled out and carried out at an angle which is inclined with respect to the reference tangential plane. After the metal sheet is passed through between the two disk cutter rolls, therefore, the metal sheet is first transported along the peripheral face of the one disk cutter roll on the inclined side. Consequently, during the process in which the metal sheet is transported along the peripheral face of the one disk cutter roll, the metal sheet is surely separated from the peripheral face of the other disk cutter roll. The metal sheet which is trans-ported along the peripheral face of the one disk cutter roll is pulled out as it is in the tangential direction, so that the metal sheet can be smoothly separated also from the one disk cutter roll. Namely, the metal sheet is sequentially separated in a stepwise manner from the peripheral faces of the two disk cutter rolls, whereby the metal sheet can be prevented from entering into an unstable state or being undulated or causing vibrations.

According to the invention, it is possible to provide an apparatus for producing a grid for a battery plate in which slits can be formed in a metal sheet while reducing shavings and wear of disk cutters, and a grid having meshes of a uniformly regular shape can be stably produced.

The invention provides a method of producing a grid for a battery plate in which two disk cutter rolls are opposed to each other, and a metal sheet is passed between the disk cutter rolls to form a large number of slits in a zigzag pattern in the metal sheet, wherein the metal sheet which has been passed through between the two disk cutter rolls is once transported along a peripheral face of one of the disk cutter rolls, and the metal sheet is then pulled out from a position of the peripheral face in a tangential direction to be carried out.

According to the invention, after being passed through between the two disk cutter rolls, a metal sheet is first transported along the peripheral face of one of the disk cutter rolls, and then pulled out in a tangential direction from a position of the peripheral face of the disk cutter roll. Therefore, the metal sheet is first surely separated from the peripheral face of the other disk cutter roll, and thereafter can be smoothly separated also from the one disk cutter roll. The metal sheet is sequentially separated in a stepwise manner from the peripheral faces of the two disk cutter rolls, whereby the metal sheet can be prevented from entering into an unstable state or being undulated or causing vibrations.

The invention is characterized in that disk cutters of the disk cutter rolls which are opposed to each other are placed with making reference circumferential faces of the disk cutters in contact with each other, to cause valleys of the disk cutters overlap with each other by a dimension d (mm) ($0<d\leq0.3$).

According to the invention, a metal sheet is passed only one time between the two disk cutter rolls to form slits in the metal sheet. Therefore, metal shavings are produced in a less amount, so that, when a grid which is produced by expanding the metal sheet is used as a positive plate, the formation efficiency and the life performance of the plate can be improved. Moreover, the load of the disk cutters is reduced, and hence the replacement frequency of the disk cutter rolls can be lowered.

According to the invention, it is possible to provide a method of producing a grid for a battery plate in which a grid having meshes of a uniformly regular shape can be produced, and slits can be stably formed in a metal sheet while reducing shavings and wear of disk cutters.

DETAILED DESCRIPTION OF THE INVENTION

Hereinafter, embodiments of the invention will be described with reference to the accompanying drawings.

Figure 1:
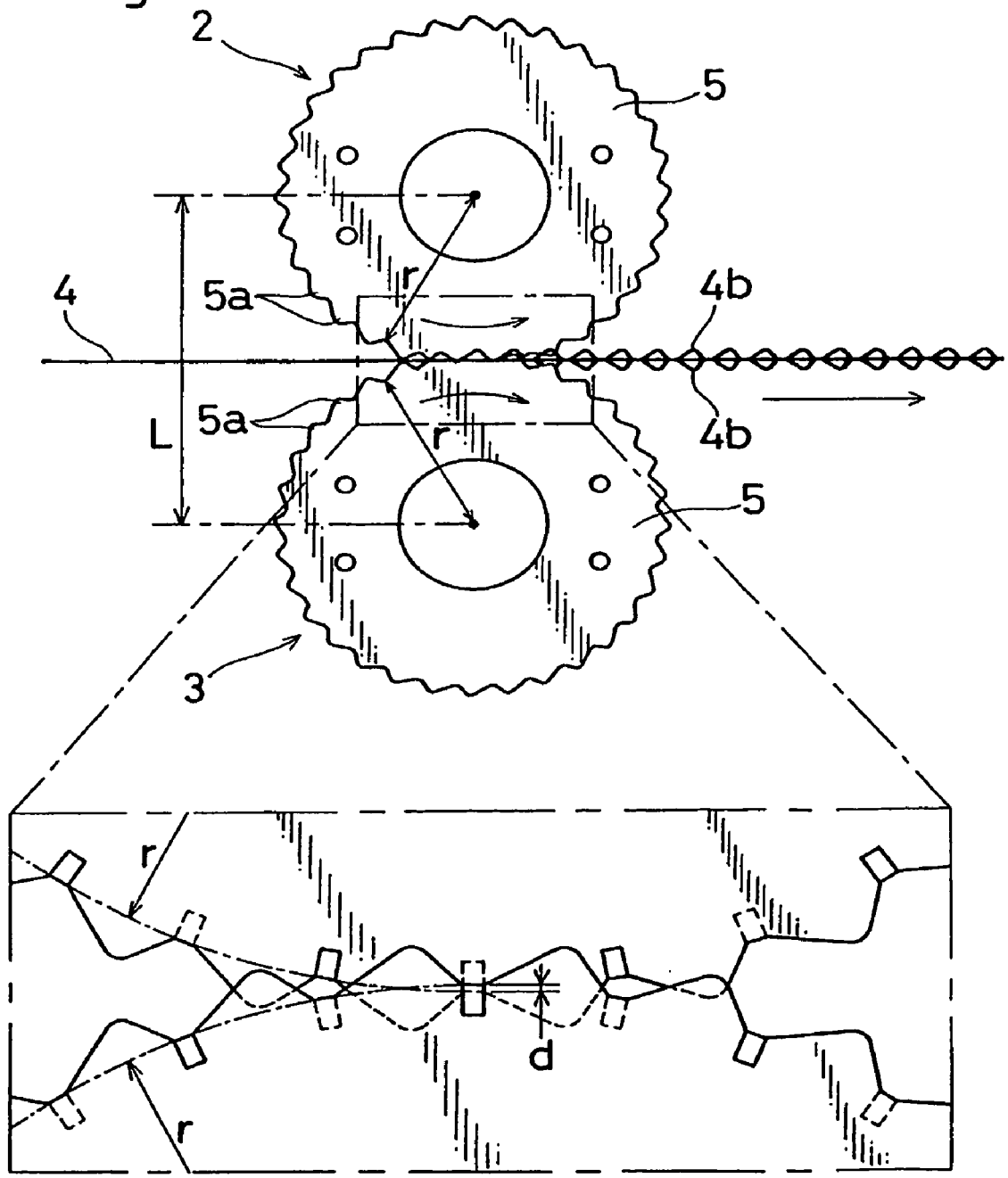
FIG. 1 is a side view showing a first embodiment of the invention, and showing a slit forming step in a rotary expander.

FIG. 1 is a side view showing a first embodiment of the invention, and showing a slit forming step in a rotary expander. The components having the same functions as those of the conventional art example shown in FIGS. 3 to 6 are denoted by the identical reference numerals.

In the embodiment, a slit forming step in a rotary expander for producing a grid which is used as a battery plate for a battery plate similar to that of the conventional art example will be described. The two disk cutter rolls 2 and 3 which are used in the slit forming step are configured in the same manner as those of the conventional art example. Namely, in each of the disk cutter rolls 2 and 3, a large number of disk cutters 5 in which the ridges 5a, the valleys 5b, and the grooves 5c are formed in peripheral edges of a metal disk are arranged and fixed on a common shaft.

AS shown in FIG. 1, the two disk cutter rolls 2 and 3 are placed so that their axes horizontally elongate and are vertically parallel to each other. The disk cutters 5 of the upper disk cutter roll 2 are placed so that each ridge 5a which reaches the lower end enters between the ridges 5a in the upper end of the corresponding disk cutters 5 of the lower disk cutter roll 3, and the disk cutters 5 of the lower disk cutter roll 3 are placed so that each ridge 5a which reaches the upper end enters between the ridges 5a in the lower end of the corresponding disk cutters 5 of the upper disk cutter roll 2. The upper and lower disk cutters 5 are placed so that their valleys 5b slightly overlap with each other. Specifically, when the axis-to-axis distance L of the two disk cutter rolls 2 and 3 is just twice ($L=2r$) the radius r of each disk cutter 5 or the distance between the axis of the disk cutter and the reference circumferential face, only the ridges 5a overlap with each other. Therefore, the axis-to-axis distance L is made slightly shorter than twice the radius r so that also the valleys 5b surely overlap with each other by the overlapping dimension d ($d>0$) shown in FIG. 1. The overlapping dimension d is set to be equal to or shorter than 0.3 mm (0.3 mm$\geq$d$>$0 mm). Therefore, the axis-to-axis distance L of the two disk cutter rolls 2 and 3 is in a range of 2r−0.3 mm$\leq$L$<$2r.

According to the configuration, the overlapping dimension d of the valleys 5b of the disk cutters 5 of the two disk cutter rolls 2 and 3 is longer than 0 mm, and the valleys surely overlap with each other. Therefore, the slits 4a can be formed in the lead sheet 4 of any thickness. Since the overlapping dimension d of the valleys 5b does not exceed 0.3 mm, it is possible to suppress lead shavings from being produced in the process of forming the slits 4a. When the overlapping dimension d exceeds 0.3 mm, shavings are produced in a large amount, and hence such a dimension is not preferable. The lead sheet 4 which has undergone the process of forming the slits 4a in this way is stretched in the width direction in an expanding step which is the subsequent step of the rotary expander, and which is not shown. As a result, the slits 4a are expanded so as to form meshes, whereby a lattice-like grid which is to be used as a battery plate of a lead storage battery is produced.

Figure 2:
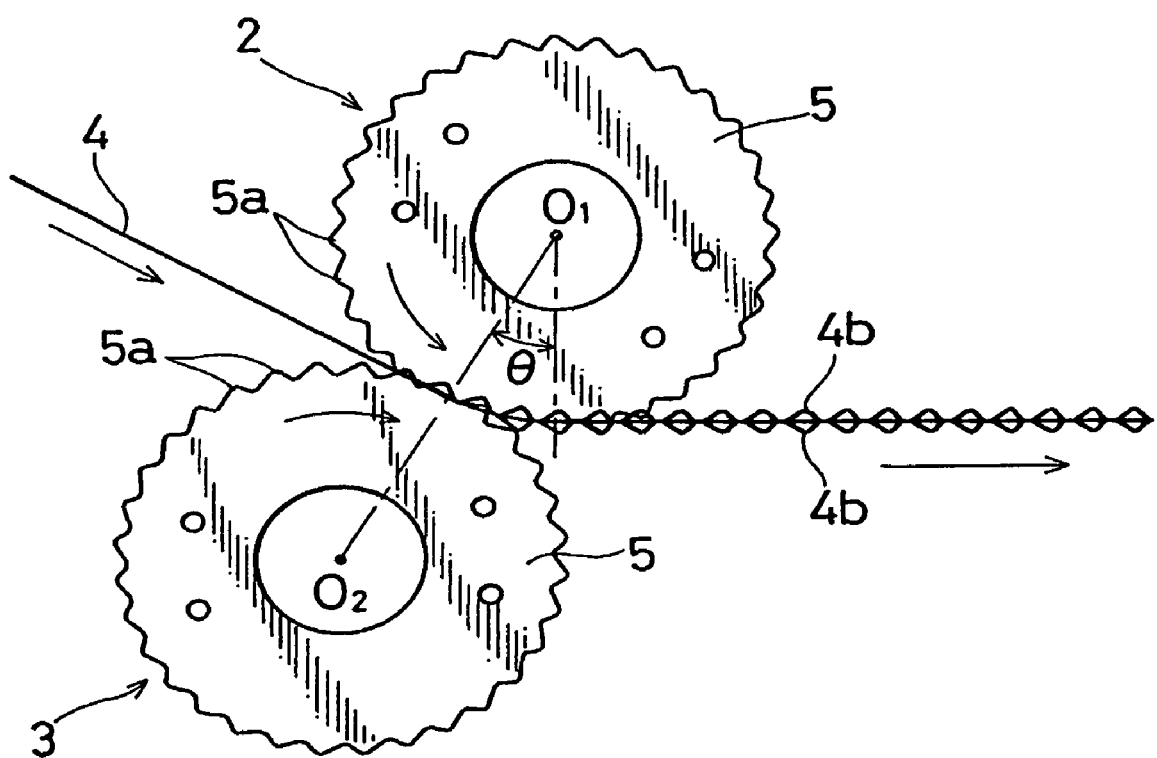
FIG. 2 is a side view showing a second embodiment of the invention, and showing a slit forming step in a rotary expander.
Figure 3:
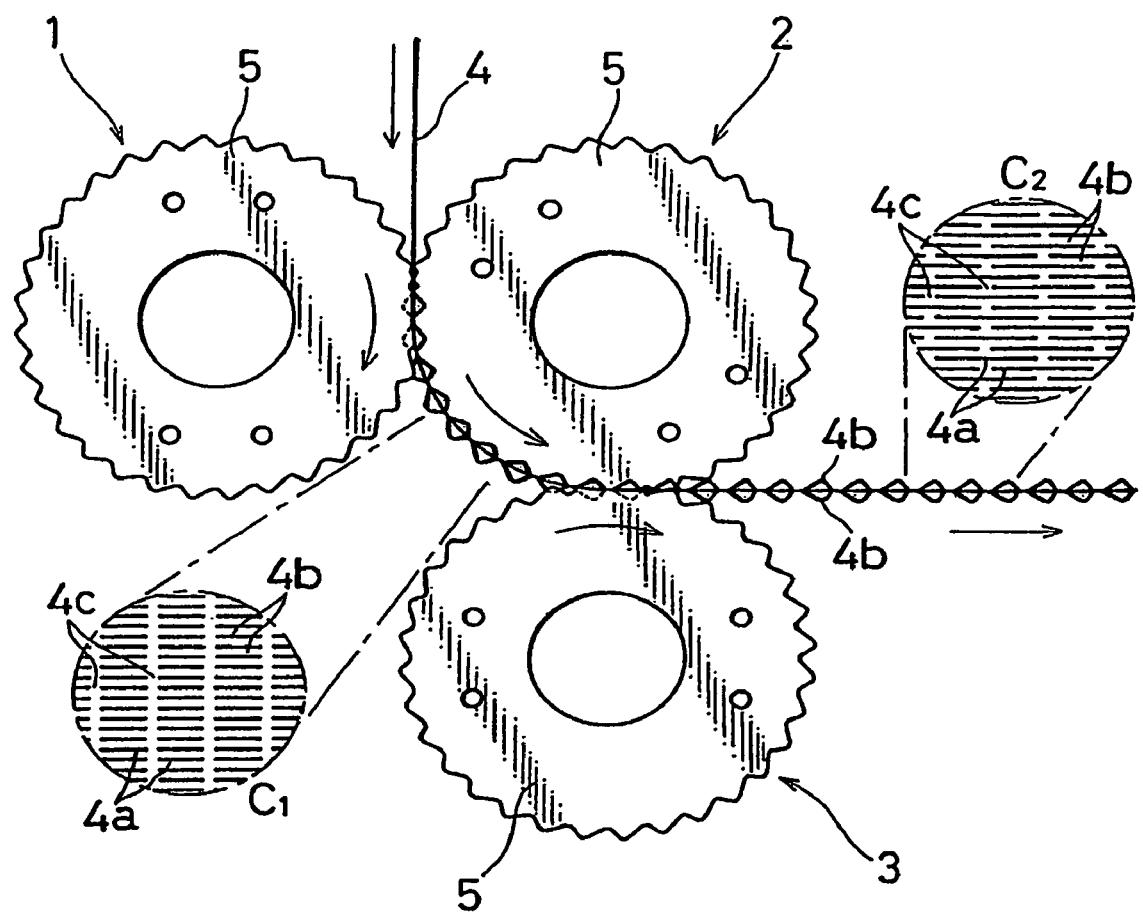
FIG. 3 is a side view showing a conventional art example, and showing a slit forming step in a rotary expander in which three disk cutter rolls are used.
Figure 4:
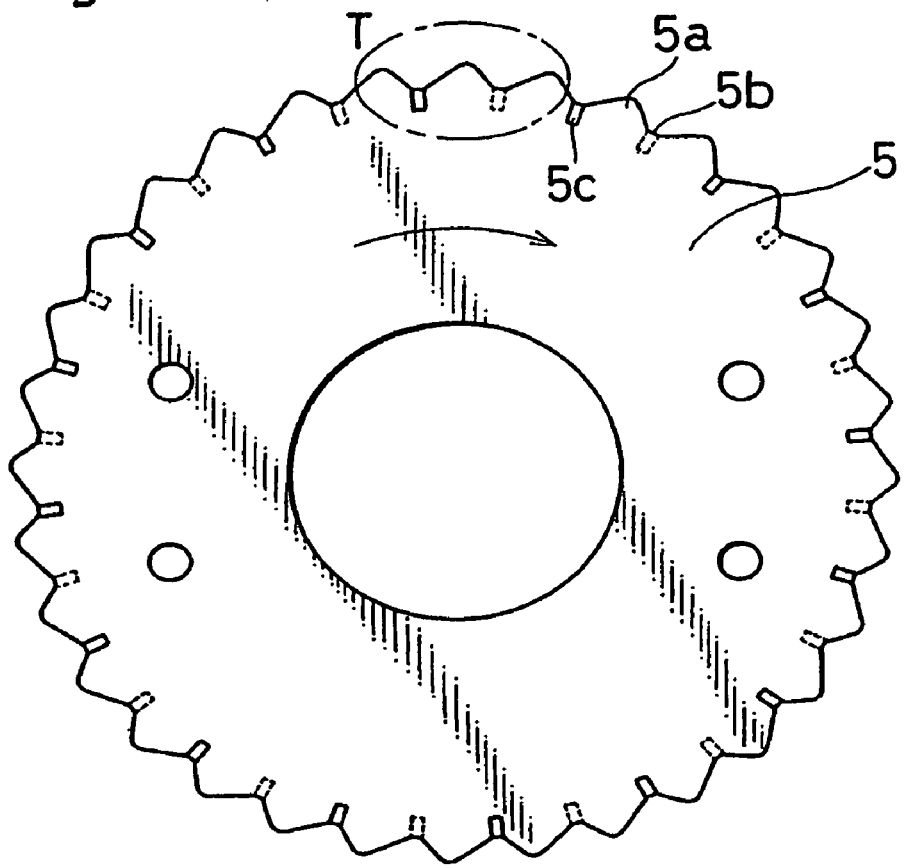
FIG. 4(a) is a side view showing the configuration of a disk cutter.
FIG. 4(b) is a partial enlarged plan view of a portion T.
FIG. 4(c) is a partial enlarged side view of the portion T.
Figure 4:
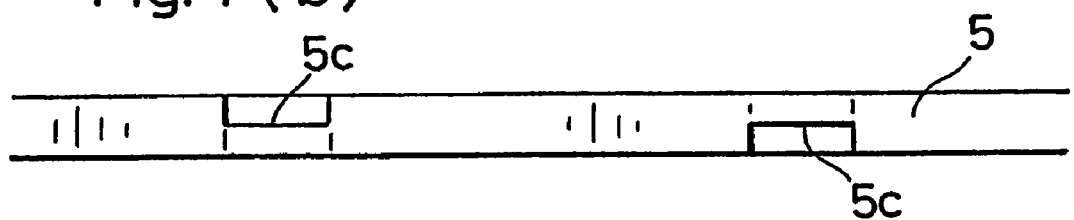
Figure 4:
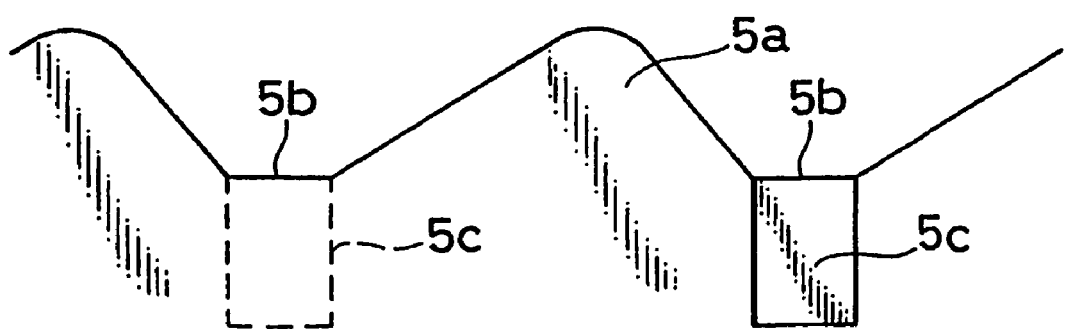
Figure 5:
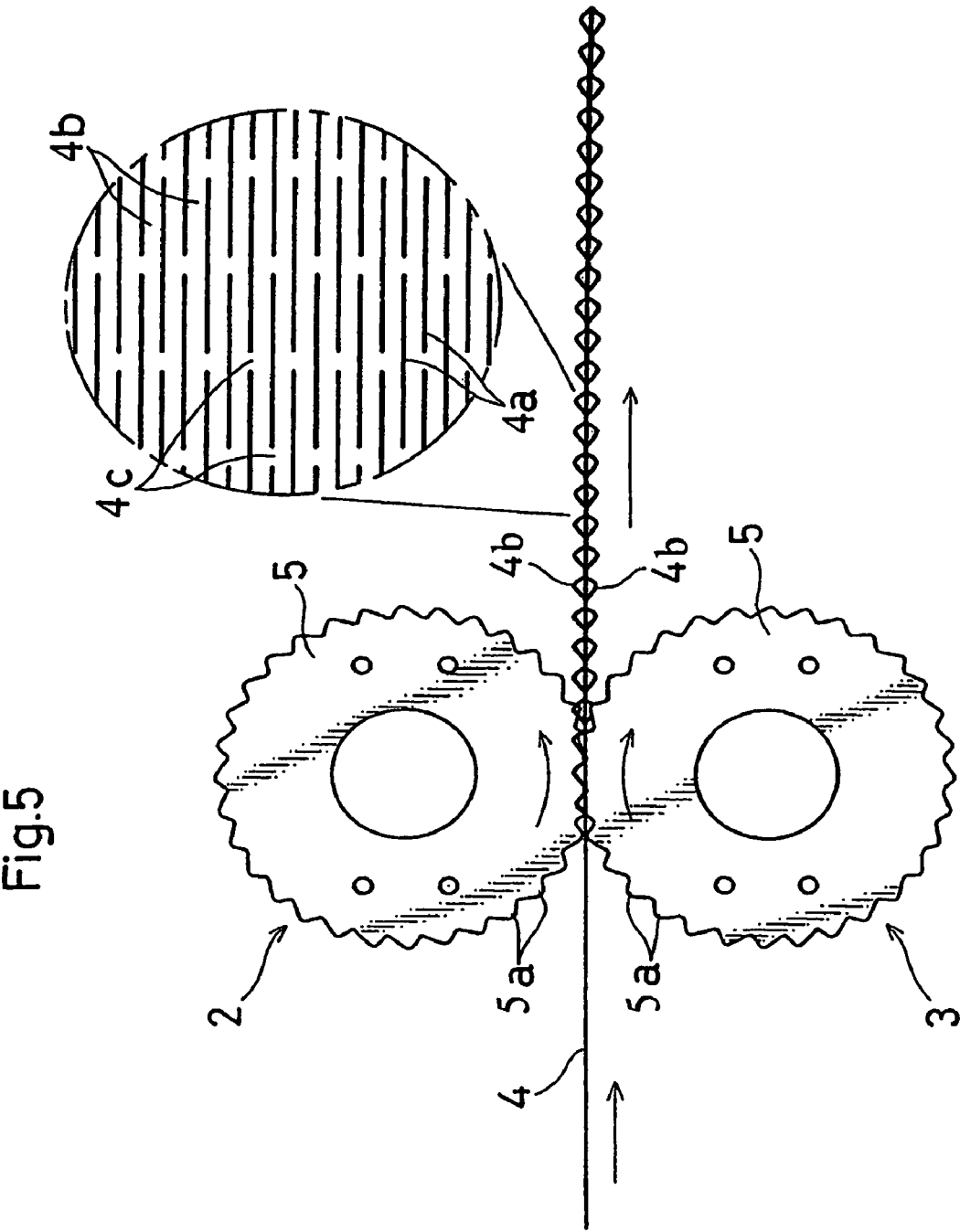
FIG. 5 is a side view showing a slit forming step in a rotary expander in which two disk cutter rolls are used.
Figure 6:
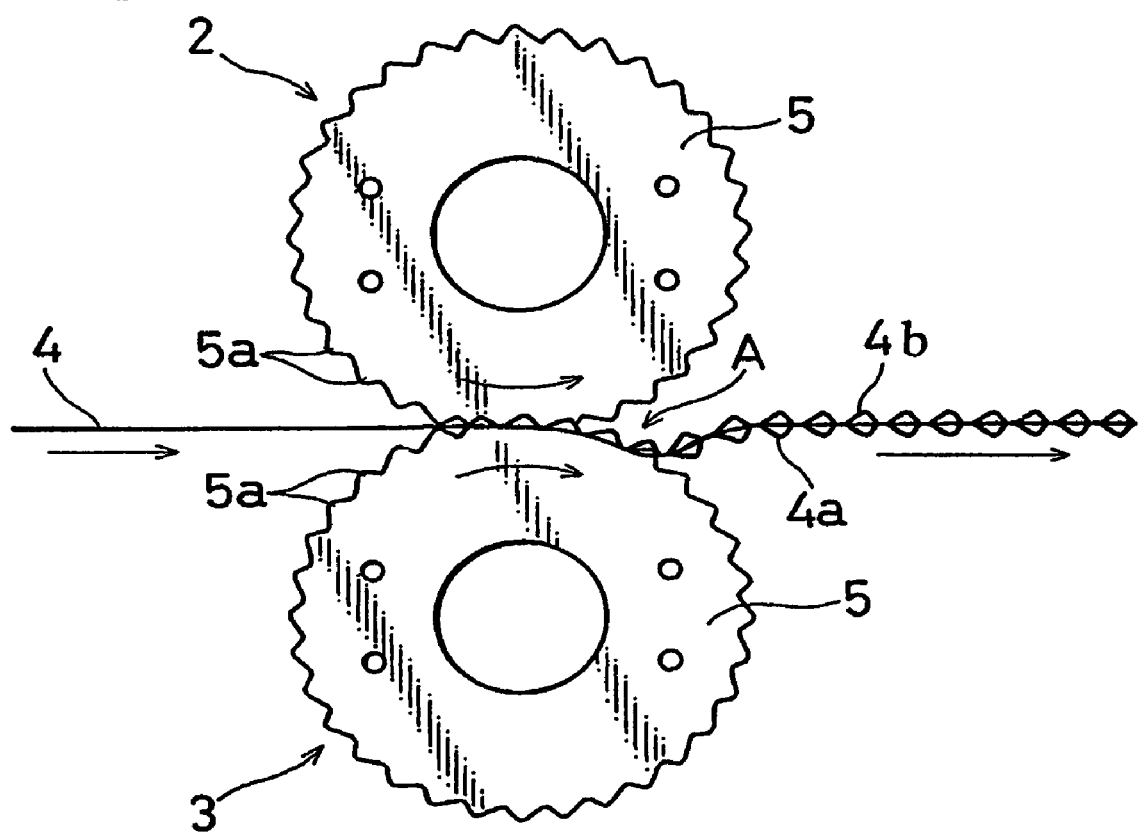
FIG. 6 is a side view showing a manner in which, in the slit forming step in the rotary expander of FIG. 5, a lead sheet which has been passed through between the two disk cutter rolls is pulled out with being undulated.

FIG. 2 is a side view showing a second embodiment of the invention, and showing a slit forming step in a rotary expander. The components having the same functions as those of the first embodiment shown in FIG. 1 are denoted by the identical reference numerals.

Unlike the first embodiment in which the disk cutter rolls 2 and 3 are placed in the strict vertical directional relationship, the disk cutter rolls 2 and 3 in the embodiment are placed in an oblique directional relationship as shown in FIG. 2. Specifically, the axis $O_1$ which is the center of the rotation shaft of the disk cutter roll 2, and the axis $O_2$ which is the center of the rotation shaft of the disk cutter roll 3 horizontally elongate in parallel to each another, but the axis $O_2$ of the lower disk cutter roll 3 is not placed in a position which is straightly below the axis $O_1$ of the upper disk cutter roll 2 but is placed in a position which is oblique by an angle θ toward the upstream side in the advancing direction of the lead sheet 4. In the same manner as the first embodiment, the axes $O_1$ and $O_2$ are positioned so as to obtain the axis-to-axis distance L at which the peripheral edges of the disk cutters 5 alternately enter the gaps to be engaged with each other, or more correctly the axis-to-axis distance L at which the valleys 5b slightly overlap with each other.

The lead sheet 4 is inserted between the disk cutter rolls 2 and 3 from an obliquely upper left side of FIG. 2, and then pulled out in the rightward and horizontal direction to be carried out. In this case, preferably, the lead sheet 4 is inserted at an angle in which the sheet is parallel to the axes $O_1$ and $O_2$ of the disk cutter rolls 2 and 3, and which is along the reference tangential plane that is perpendicular to the plane connecting the axes $O_1$ and $O_2$. This is because of the following reason. The reference tangential plane is a tangential plane which is common to the peripheral edges of both the disk cutter rolls 2 and 3. When the lead sheet 4 is inserted between the upper and lower disk cutter rolls 2 and 3 along the reference tangential plane, therefore, the formations of the slits 4a in both the faces of the lead sheet 4 by the upper and lower disk cutters 5 can be started at a substantially same timing. In the case where the contact of only the ridges 5a of the disk cutters 5 of one of the disk cutter rolls 2 and 3 with the face of the lead sheet 4 immediately before the insertion is allowed, however, the lead sheet 4 can be inserted between the disk cutter rolls 2 and 3 at an angle which is inclined with respect to the reference tangential plane. When the lead sheet 4 is horizontally inserted between the disk cutter rolls 2 and 3 from the left side, for example, the lower face of the lead sheet 4 is first in contact with the ridges 5a of the disk cutters 5 of the lower disk cutter roll 3, and under this state the sheet is transported by the angle θ along the peripheral face of the lower disk cutter roll 3. Immediately before this, the formations of the slits 4a by the disk cutters 5 of the upper and lower disk cutter rolls 2 and 3 are started.

When the formations of the slits 4a in the lead sheet 4 by the upper and lower disk cutters 5 of the upper and lower disk cutter rolls 2 and 3 are performed, the lead sheet 4 is once transported by the angle θ along the peripheral face of the upper disk cutter roll 2. After the sheet reaches the lower end of the peripheral face of the upper disk cutter roll 2, the sheet is pulled out in the tangential direction, i.e., the rightward and horizontal direction to be carried out. Namely, the lead sheet 4 is pulled out at a carrying-out angle which is upward inclined by the angle θ with respect to the tangential plane of the two disk cutter rolls 2 and 3. The lead sheet 4 which has undergone the process of forming the slits 4a in this way is stretched in the width direction in an expanding step which is the subsequent step of the rotary expander, and which is not shown. As a result, the slits 4a are expanded so as to form meshes, whereby a lattice-like grid which is to be used as a battery plate of a lead storage battery is produced.

According to the embodiment, when the lead sheet 4 has been passed through between the upper and lower disk cutter rolls 2 and 3 and the slits 4a are formed by the disk cutters 5, the lead sheet is once transported by the angle θ along the peripheral face of the upper disk cutter roll 2, and hence the sheet is surely separated from the peripheral face of the lower disk cutter roll 3. In other words, in the lead sheet 4 between the disk cutter rolls 2 and 3, the ridges 5a of the upper and lower disk cutters 5 vertically penetrate the faces of the sheet to bite between the slits 4a. When the lead sheet 4 is transported along the peripheral face of the upper disk cutter roll 2, the ridges 5a of the disk cutters 5 of the lower disk cutter roll 3 are compulsively extracted from between the slits 4a. When the lead sheet 4 which is transported along the peripheral face of the upper disk cutter roll 2 reaches the lower end of the peripheral face, the sheet is pulled out in the rightward and horizontal direction. Therefore, it is required only to extract the ridges 5a of the upper disk cutters 5 from between the slits 4a, so that the sheet is smoothly separated in a stepwise manner from the roll to be carried out without causing an unstable condition. Consequently, the lead sheet 4 is sequentially separated from the peripheral faces of the two upper and lower disk cutter rolls 2 and 3, whereby the lead sheet can be prevented from entering into an unstable state or being undulated or causing vibrations.

In FIG. 2 of the embodiment, the angle θ which is equal to the carrying-out angle of the lead sheet 4 with respect to the reference tangential plane of the two disk cutter rolls 2 and 3 is shown as an angle of about 30°. The angle θ may have any value as far as it is sufficiently larger than 0°. Practically, it is preferable to set the angle to be equal to or smaller than 90°.

Although the embodiment in which, in order to horizontally pull out the lead sheet 4, the disk cutter rolls 2 and 3 are placed with being inclined by the angle θ has been described, the two disk cutter rolls 2 and 3 may be placed in any directional relationship as far as the distance between the axes $O_1$ and $O_2$ can be maintained. In the case where the disk cutter rolls 2 and 3 are placed in the strict vertical positional relationship as in the conventional art example, for example, the lead sheet 4 may be pulled out and carried out not in the rightward and horizontal direction but in a direction which is upward or downward inclined with respect to the horizontal direction.

Although the embodiments in which the disk cutters 5 of the disk cutter rolls 2 and 3 have the configuration in which the large number of the ridges 5a are formed on the peripheral edge and the grooves 5c that are opened in the valleys 5b between the ridges 5a are formed alternately in the both disk faces have been described, the configuration of the peripheral edges of the disk cutters 5 is not restricted as far as the slits 4a can be formed in the lead sheet 4 in a zigzag pattern.

Although the embodiments in which a grid which is to be used as a battery plate of a lead storage battery is produced by processing the lead sheet 4 made of lead or a lead alloy have been described, the invention can be applied to a battery of any type including a lead storage battery as far as a similar grid is used as a current collector member of a battery plate. Such a grid can be produced by using a metal sheet of an appropriate material which is suitable to the kind of the battery.

EXAMPLE 1

Lead sheets 4 (for example, Pb-0.065 wt. % Ca-1.3 wt. % Sn was used) were processed into grids by a rotary expander which uses the two disk cutter rolls 2 and 3 of the first embodiment, a rotary expander which uses the three disk cutter rolls 1 to 3 of the conventional art example, and a reciprocal expander, and the grids were compared with one another.

In the rotary expander of the first embodiment, grids were produced while the axis-to-axis distance L of the two disk cutter rolls 2 and 3 was variously set. In the reciprocal expander, for the sake of comparison, lead sheets 4 of the same lot were used, and grids which are identical in weight and mesh shape were produced.

After an active material was filled into the grids produced by these expanders, the grids were cured and dried to form positive plates. The positive plates, and negative plates which were produced by a conventional method were combined with separators which are configured mainly by microporous polyethylene to produce lead storage batteries of Type 55D23 (Japanese Industrial Standard JIS D 5301) for an automobile. A given amount of dilute sulfuric acid of a predetermined specific gravity was poured and formation was performed to complete the lead storage batteries.

The thus produced lead storage batteries were investigated with respect to the rate of production of shavings during the production process of the grids, the formation efficiency after supplying the same quantity of electricity, the light-load life performance at 75° C. (tested by a method according to Japanese Industrial Standard JIS D 5301, and the shortest life of the disk cutters 5 in a continuous production test. Table 1 below shows results of the comparisons.

The comparisons were conducted on the first embodiment and examples in the following manner. The lead sheets 4 were always pulled out and carried out in the rightward and horizontal direction to be fed to the expanding step. By changing the angle θ of the disk cutter rolls 2 and 3, the carrying-out angle θ of the lead sheet 4 in the first embodiment was set to

TABLE 1

| Number of rolls | axis distance L (mm) | Rate of production of shavings (%) | efficiency (%) | life performance at 75° C. (cycle) | life of cutter (month) | Remarks |
|---|---|---|---|---|---|---|
| 3 | — | 100 | 100 | 2,000 | 12 | Conventional art example |
| 2 | 2r-0.05 | 10 | 123 | 3,500 | 35 | Example |
| 2 | 2r-0.2 | 12 | 122 | 3,600 | 36 | Example |
| 2 | 2r-0.3 | 18 | 120 | 3,400 | 33 | Example |
| 2 | 2r-0.4 | 25 | 118 | 2,900 | 27 | Example |
| 2 | 2r-0.5 | 33 | 116 | 2,200 | 19 | Example |
| Reciprocal | — | — | 102 | 2,800 | — | Comparative example |

As apparent from Table 1 above, the amount of lead shavings produced during the process was greatly reduced as compared with the grids produced by the rotary expander of the conventional art example. In accordance with the reduction of lead shavings, also the production amount of $PbO_2$ in the case where formation was conducted at the same quantity of electricity was improved. Since stress acting on the lead sheet 4 is reduced, the corrosion resistance of the grids was enhanced, and the JIS light-load life performance was remarkably improved when the axis-to-axis distance L is shorter than 2r–0.3 mm, however, the degree of elongation during formation of the slits 4a is increased, and the nodes 4c are largely deformed, so that the corrosion resistance was lowered. The life of each disk cutter 5 is greatly prolonged. The disk cutters 5 of the two rolls, i.e., the disk cutter rolls 2 and 3 are used, and the disk cutters are therefore reduced in number to two thirds of those of the three rolls in the conventional art example. Consequently, it was seen that the embodiment achieves a very large economic effect.

EXAMPLE 2

The slits 4a were formed in the lead sheets 4 in the slit forming step by the rotary expander of the second embodiment, and in that by the rotary expander of the first embodiment, and compared with each other. Table 2 below shows results of the comparisons.

0°, and that in the examples was changed from 5° to an angle which is larger than 9°.

In the disk cutter rolls 2 and 3, a vertical displacement gauge was disposed to measure an average vibration amplitude in the process of forming the slits 4a. The ratios of vibration amplitudes of the examples having the various carrying-out angle θ were investigated while setting the vibration amplitude of the first embodiment as 100. Grids which were expanded to a predetermined degree after the slits 4a were formed in the lead sheet 4 were investigated on a ratio of numbers of cracks of corrosion of grids of the examples respectively having the various carrying-out angles θ while setting the ratio of the first embodiment as 100. Furthermore, an active material was filled into grids which were produced with adjusting the process speeds of the slit forming step and the expanding step so as not cause a crack of corrosion in the grids, and the grids were then cured and dried to be formed as positive plates. The positive plates were incorporated into lead storage batteries (Type 55D23 of JIS). A JIS overcharge life test was conducted on the lead storage batteries for one month. Thereafter, the corrosion amounts of the grids were checked, and ratios of corrosion amounts of the examples respectively having the various carrying-out angles θ were obtained while setting the ratio of the first embodiment as 100. In all of the lead storage batteries, a battery plate which was produced according to the first embodiment was used as

TABLE 2

| Carrying out angle θ of lead sheet | Ratio of average vibration amplitudes of roll pair (first embodiment = 100) | Ratio of numbers of cracks of corrosion of grids (first embodiment = 100) | Ratio of corrosion amount after overcharge test (first embodiment = 100) | Remarks |
|---|---|---|---|---|
| 0° | 100 | 100 | 100 | First embodiment |
| 5° | 96 | 97 | 97 | Example |
| 15° | 85 | 93 | 93 | Example |
| 30° | 73 | 88 | 84 | Example |
| 45° | 65 | 82 | 70 | Example |
| 60° | 51 | 78 | 62 | Example |
| 75° | 43 | 73 | 87 | Example |
| 90° | 35 | 69 | 95 | Example |
| 105° | 103 | 105 | 103 | — |
| 120° | 110 | 110 | 120 | — | the negative plate, and a separator which is configured mainly by microporous polyethylene was interposed between the plates.

As a result of the comparison tests, with respect to the ratio of the average vibration amplitudes and that of the numbers of cracks of corrosion in the disk cutter rolls 2 and 3, an example in which the carrying-out angle θ of the lead sheet 4 is larger achieved a more excellent result while the minimum value was attained in the example of the carrying-out angle θ of 90°. With respect to the ratio of the corrosion amounts, the examples in which the carrying-out angle θ is 45° to 60° exhibited the minimum value. Even in the example of the carrying-out angle θ of 90°, the corrosion amount is smaller than that of the first embodiment. The phenomenon in which the ratio of the corrosion amounts of grids is larger as the carrying-out angle θ of the lead sheet 4 is larger is seemed to be caused because the lead sheet 4 is transported along the peripheral face of the upper disk cutter roll 2 by a longer distance as the carrying-out angle θ is larger, and hence the lead sheet 4 is largely bent during this process to increase distortion.

As apparent from the above description, according to the apparatus for producing a grid for a battery plate of the invention, shavings produced during the process of forming slits can be greatly reduced, and the life performance can be extremely improved. According to the method of producing a grid for a battery plate of the invention, after a metal sheet is passed through two disk cutter rolls, the metal sheet is sequentially separated in a stepwise manner from the peripheral faces of the disk cutter rolls. Therefore, the metal sheet can be prevented from entering into an unstable state or being undulated or causing vibrations.

It is a matter of course that, when the configurations of Examples 1 and 2 are combined with each other, the effects due to the respective configurations synergistically cooperate to realize an apparatus for producing a grid for a battery plate and a method of producing the same in which slits can be formed in a metal sheet while reducing shavings and wear of disk cutters, and a grid having meshes of a uniformly regular shape can be stably produced.

What is claimed is:

1. A method for producing a lead acid battery, comprising:
    passing a metal sheet which is made of lead or lead alloy between two disk cutter rolls to form slits in said metal sheet in a staggered pattern, wherein each of said two disk cutter rolls includes ridges which are formed in a whole periphery of each of said two disk cutter rolls to penetrate said metal sheet;
    then carrying said metal sheet along a peripheral face of one of said disk cutter rolls;
    then pulling out said metal sheet from said peripheral face in a tangential direction to said peripheral face, wherein said tangential direction is tangent to said peripheral face at a point where said metal sheet is detached from said peripheral face; and
    then producing a lead acid battery by using said metal sheet as a grid for an electrode, wherein
    a plane defined by axes of rotation of said disk cutter rolls and a plane perpendicular to said tangential direction define an angle θ which ranges from 5 degrees to 90 degrees,
    wherein at said pulling out step said ridges of one of said two disk cutter rolls are extracted from said slits of said metal sheet after said ridges of the other one of said two disk cutter rolls are extracted from said slits of said metal sheet so as to prevent said metal sheet from being undulated when pulling out said metal sheet from said peripheral face, and said disk cutter rolls are arranged such that said plane defined by the axes of rotation of said disk cutter rolls is at an oblique angle with respect to true vertical.

2. The method for producing the lead acid battery according to claim 1, wherein
    said metal sheet is arranged to travel along a feed course, said feed course being arranged to approach said disk cutter rolls, to subsequently pass between said disk cutter rolls, and subsequently to withdraw away from said disk cutter rolls; and
    an approach angle of said metal sheet with respect to said plane defined by axes of rotation of said disk cutter rolls differs from a withdrawal angle of said metal sheet with respect to said plane defined by the axes of rotation of the disk cutter rolls.

3. The method for producing the lead acid battery according to claim 1, wherein
    said lead acid battery includes dilute sulfuric acid.

* * * * *